Patented Sept. 27, 1927.

1,643,507

UNITED STATES PATENT OFFICE.

FERDINAND MATZELLE, OF SAGINAW, MICHIGAN.

CEREAL FOOD PRODUCT.

No Drawing.　　　Application filed May 22, 1926.　Serial No. 111,069.

The object of this invention is to produce a loaf of bread that has certain characteristics of ordinary white bread and certain other characteristics of whole wheat bread or other well known coarse breads, such as bran bread, but without certain other features which have proven to be drawbacks in the marketing of these coarser breads.

A further object is to produce a loaf of bread that will not dry out rapidly and become stale, but will remain moist and in fine condition for a much longer time than ordinary white bread or the coarser breads above mentioned.

Another object is to produce a loaf that has a pleasing and attractive color, neither dark as is the case with whole wheat bread or bran bread, nor yet snow white, as with ordinary white bread, but this bread has a pleasing shade or color intermediate between the two.

Furthermore, my invention provides a loaf which in appearance when cut is of fine texture and smooth, the cut surface being quite similar in grain to that of a well made loaf of white bread. Yet my improved loaf, due to the ingredients employed as herein claimed, does not act when chewed, like ordinary white bread, that is to say, it does not form in the mouth a dough-like mass that terminates in a liquid of paste-like feeling in the mouth, but on the contrary, the particles when chewed have a more friable rather than paste-like feeling until chewing is completed and produce about the same sensation in the mouth as is produced by the chewing of whole wheat bread or bran bread, although it has not the distinctive granular feeling of bran bread.

I attain these objects by the employment of a new combination of ingredients. Each of the individual ingredients has been ordinarily employed in the manufacture of baked goods such as bread and similar products, but when employed in combination in a loaf of bread substantially as will be set forth herein, they impart to the bread all the advantages and novel effects above set forth in the announcement of the objects of my invention.

An incidental result of the use of my improved combination of ingredients is that the amount of shortening used can be, and in my practice is considerably decreased, without in any way imparing the taste or physical characteristics of the loaf. This reduction in the amount of shortening is made possible because one of the ingredients which I employ, namely, ground buckwheat flour, of itself contains substances that to a certain extent produce the same effect in the loaf as does shortening.

With the foregoing and certain other objects in view, my invention consists in making bread comprising the combination of ingredients which will now be described and set forth in the claims.

To produce eleven loaves weighing one pound seven ounces each, I use the following material:

Wheat flour—patent, containing about twelve per cent gluten—one hundred forty four ounces.
Ground buckwheat—twelve ounces.
Gluten flour—eight ounces.
Salt—three ounces.
Butter—two ounces.
Sugar—three ounces.
Water—ninety six ounces.
Yeast—five ounces.

Considering the above flour ingredients as a whole, the patent wheat flour comprises eighty eight per cent of the total, the ground buckwheat flour seven per cent and the gluten flour five per cent.

In making bread from this formula I use enough water to dissolve the yeast. I next take the salt, sugar and the remainder of the water and stir. Then I add the gluten flour and after this add the patent flour and the yeast. I then mix it until the mixing is about half completed and then add the ground buckwheat and the shortening, lard or butter. All these materials are then worked together until smooth. The dough is raised twice and only half way the third time.

The mixing can be done by hand or with a mechanical mixer of either high or low speed, and the bread can be made into loaves by the usual molders and dividers.

The bread is baked in the ordinary manner and under the ordinary conditions required for the baking of white bread, bran bread or whole wheat bread.

As will be seen from the above formula, the ingredients are those commonly used for white bread, except for the addition of gluten flour and ground buckwheat. The ground buckwheat gives an extremely palatable flavor to the loaf. It reduces the amount of shortening that would otherwise be required, because the buckwheat to a certain extent acts as shortening material.

The gluten flour and buckwheat give the richness or shortening cake-like effect that is obtained in the ordinary white bread formula by the use of milk. No milk is used in my improved combination of ingredients. The buckwheat also gives the desirable shade of color to the finished loaf and also imparts to the loaf the desired chewing characteristics that have been explained above.

The gluten flour corrects the tendency which the loaf would otherwise have, of showing a coarse grain when cut. It does not interfere with the chewing characteristics just noted, but it gives to the cut loaf an appearance of smoothness and fine grain which is characteristic of white bread and very desirable in coarser breads.

In referring to ground buckwheat, to bran and to whole wheat etc. in this specification, I refer to the usual degree of fineness to which these respective substances are usually ground and sold in the market.

The buckwheat imparts to the loaf a delicious and characteristic flavor that is not found in ordinary breads, either white or darker and coarse grain kinds.

This is a bread that has a distinctive flavor and it has the chewing characteristics of Graham bread, but it has other important advantages over such bread. When this bread is eaten, after being soaked with hot milk or hot meat gravy the slice retains its shape, whereas Graham bread will crumble and go to pieces and ordinary white bread, if made rich enough to have a desirable flavor, will go to pieces and become soft and partly dissolved in the milk or gravy.

For securing a delicate flavor I use approximately six per cent or seven per cent of ground buckwheat flour. This amount is preferable for it is about as much as can be used satisfactorily, although it is possible to obtain very good results by using as much as eight or ten per cent of buckwheat flour. I have found that less than six per cent does not give nearly so satisfactory results.

By means of the foregoing combination of ingredients I have produced a loaf of bread that has a distinctive and attractive flavor, a characteristic color, a delicate crust and that is capable of remaining exposed to the air and remain in a moist and palatable condition for a relatively great length of time. As a result, bread made according to this formula can be shipped longer distances without becoming stale and can be longer carried in stock by dealers, thereby reducing the cost of delivering the finished product from the bakery to the consumer.

Having thus described my invention, what I claim and desire to secure by Letters Patent is:

1. As an improvement in the manufacture of leavened bread, a bread loaf of standard size, weight and uniformity of texture characteristic of the ordinary white loaf and containing in addition to the usual constituents of such white loaf an ingredient, namely, buckwheat flour, for imparting a pleasing color, taste and chewing characteristics and greater friability of crumb, said loaf also containing another ingredient, gluten flour, for imparting to the buckwheat-containing loaf the springiness and fineness of grain characteristic of the ordinary white loaf.

2. As an improvement in the manufacture of leavened bread, a bread loaf of size, weight and uniformity of texture characteristic of the ordinary white loaf and containing in addition to the usual constituents of such white loaf an ingredient, namely, buckwheat flour, for imparting a pleasing color, taste and chewing characteristics, said loaf also containing another ingredient, gluten flour, for imparting to the buckwheat-containing loaf the springiness and fineness of grain characteristic of the ordinary white loaf, the said flour ingredients incorporated in substantially the following proportions: buckwheat flour seven per cent, gluten flour five per cent.

In testimony whereof, I affix my signature.

FERDINAND MATZELLE.